ELECTRICAL CIRCUIT SYSTEMS, MODULE CONNECTIONS, METHODS AND APPARATUS

Original Filed Dec. 29, 1958

8 Sheets-Sheet 1

INVENTOR.
Paul T. Hahn
Robert C. Swengel
BY
Curtis, Morris & Safford

INVENTOR.
PAUL T. HAHN
ROBERT C. SWENGEL
BY
Curtis, Morris & Safford

INVENTOR.
PAUL T. HAHN
BY ROBERT C. SWENGEL

Curtis, Morris & Safford

INVENTOR.
PAUL T. HAHN
BY ROBERT C. SWENGEL
Curtis, Morris & Safford

INVENTOR.
PAUL T. HAHN
BY ROBERT C. SWENGEL
Curtis, Morris & Safford

INVENTOR.
PAUL T. HAHN
BY ROBERT C. SWENGEL

Curtis, Morris & Safford

Aug. 2, 1966 R. C. SWENGEL ET AL 3,264,525

ELECTRICAL CIRCUIT SYSTEMS, MODULE CONNECTIONS, METHODS AND APPARATUS

Original Filed Dec. 29, 1958

8 Sheets-Sheet 8

INVENTOR.
PAUL T. HAHN
BY ROBERT C. SWENGEL

Curtis, Morris & Safford

United States Patent Office 3,264,525

Patented August 2, 1966

3,264,525

ELECTRICAL CIRCUIT SYSTEMS, MODULE CONNECTIONS, METHODS AND APPARATUS

Robert C. Swengel, Hellam, and Paul T. Hahn, Harrisburg, Pa., assignors to AMP Incorporated, Harrisburg, Pa.

Continuation of application Ser. No. 783,296, Dec. 29, 1958. This application Dec. 16, 1964, Ser. No. 418,758

26 Claims. (Cl. 317—101)

This is a continuation of application Serial No. 783,296, filed December 29, 1958, now abandoned.

The present invention relates to electrical circuit systems, module connectors, methods and apparatus, more particularly this invention relates to electrical circuit systems including a plurality of spaced support members having two-dimensional expanses of printed circuits and wherein said members define pairs of opposed faces, each face having a plurality of elongated parallel conductors extending therealong and each conductor making contact by resilient action at a multiplicity of points along its length with a corresponding plurality of elongated parallel conductors extending along the side of plug-in electrical circuit components which are supported in positions between the faces of the support members. This invention also relates more particularly to module connectors, methods, and apparatus enabling circuit modules conveniently and easily to be plugged into and removed from electrical equipment for assembly and maintenance of equipment and providing rugged reliability in operation under demanding conditions of use by virtue of having each detachable circuit connection made by a multiplicity of independently acting resilient contact elements operating in parallel electrical relationship and any one of which is adequate to make the connection. The invention as described is extremely well suited for use in systems and equipment including miniaturized circuit modules, termed "micro modules," and provides many advantages in the field of micro modules.

Among the many advantages of the systems, connectors, methods and apparatus described as illustrative examples of the invention are those resulting from the fact that the circuit components are incorporated in minute blocks or modules which are readily plugged into position in sandwich-like relationship between pairs of spaced parallel support members and are supported and protected thereby.

The support members themselves have areas of printed circuits providing interconnection between the circuit components of the various modules and associated equipment. A plurality of resilient contact connectors engage between each plug-in module and one or more of the support members. Each contact connector is elongated and advantageously provides a multiplicity of independent resilient contact ears along its length which operate in parallel with each other, thus assuring good conduction between engaging parts and reliable contact therebetween. Moreover, the reliability of contact is maintained in spite of adverse environmental conditions such as vibrations, or rapid accelerations or decelerations, or spinning motions.

In these illustrative examples the support members define box-like receptacles into which the micro modules are plugged. The printed circuit conductors are shown as extending along contact channels in the inner faces of the support members. Accordingly, the printed circuit conductors are well protected against any accidental damage resulting from rough handling during servicing of the equipment or during removal and replacement of the micro modules. The front end surfaces of the micro modules are conveniently accessible for handling the modules and are adapted to present coded marks and identification colors as an aid to the replacement and substitution of micro modules.

Advantageously, the box-like receptacles which receive, interconnect, support, and protect the various micro modules are themselves enabled to be plugged into larger mountings, wherever desired. A greater flexibility and convenience in assembling and servicing complex aggregations of electrical equipment is provided together with a very high level of reliability assuring proper performance under severe operating conditions.

In these illustrative embodiments of the present invention the resilient contact connectors provide substantial mechanical strength and support to associated structural elements by virtue of their U-shape as seen in cross section. The bight of each U-shaped resilient connector is secured to suitable electrical connection means, and the legs are extended and make resilient contact at a multiplicity of areas spaced along the length of the adjacent printed circuit conductors. As mentioned above, these printed circuit conductors lie in channels, and they extend along opposite walls of the channels in positions to engage the legs of the U-shaped resilient contacts.

Moreover, the legs of each U-shaped resilient connector provide heat dissipation surfaces for removing heat from the micro modules. When desired, heat absorbing dielectric fluids in either gaseous or liquid form can be traversed along the troughs between the legs of the resilient connectors for removing additional heat.

Further advantages in operation result from the short direct connection paths provided which minimize electrical losses and capacitance or inductance effects as well as enabling better isolation of the various circuit assemblies one from another.

In the preferred reliable detachable connections described herein strips of metal extending along the sides of the micro modules make contact with adjacent elongated contact conductors at a multiplicity of points. These strips of metal each include a plurality of independently acting resilient contact ears which are biased toward engagement with the elongated conductors. Any one of the ears on each metal strip is quite adequate to complete its connection and the multiplicity of these ears acting in parallel electrical relationship provides extremely high reliability in assuring maintenance of circuit continuity.

In these preferred connections the elongated conductors comprise conductive areas extending along opposite side walls of contact grooves formed in the inner faces of the support members. The resilient contact ears on each strip are formed in two rows, and these rows of ears are biased in opposite directions toward engagement with the opposite side walls of the contact grooves. As a result, there is assured the continued engagement of at least one contact ear with at least one of the side walls of the contact groove, regardless of the occurrence of external forces such as sudden accelerations or vibrations. Moreover, by virtue of the fact that the planes of the conductive side walls of the contact grooves are generally perpendicular to the respective adjacent sides of the micro module, there is provided a relatively great tolerance to variations in sizes of micro modules which will operate properly when plugged into position adjacent to the support members.

Electronic equipment embodying the systems, module connectors, methods and apparatus of the present system can readily be serviced and maintained by relatively unskilled personnel and yet an extremely reliable and high quality of performance is provided.

In this specification and in the accompanying drawings, are described and shown systems, module connectors, methods and apparatus embodying the invention and various modifications thereof are indicated, but it is to be understood that these are not intended to be exhaustive nor limiting of the invention, but on the contrary are given for purposes of illustration in order that others skilled in the art may fully understand the invention and the manner of applying the method and apparatus in practical use so that they may modify and adapt them in various forms, each as may be best suited to the conditions of a particular use.

The various objects, aspects, and advantages of the present invention will be more fully understood from a consideration of the following specification in conjunction with the accompanying drawings, in which:

FIGURE 1 is an exploded perspective view of an example of a micro module circuit system, connector, method and apparatus embodying the present invention. This figure shows two micro modules already positioned between support members arranged in the form of a multiple receptacle printed circuit box, and a third micro module is illustrated in position ready to be inserted endwise into the near end of the circuit box. A fourth unit is shown close to the far end of the circuit box in position ready to be inserted therein and having an electrical cable extending therefrom for interconnection purposes. The circuit box itself is shown poised above a multiple receptacle mounting and in position to be plugged down into the mounting.

FIGURE 8 is on the same scale as FIGURES 6 and 7 and shows the blank after being cut to shape but before being bowed up longitudinally into a U-shape;

Figure 9:
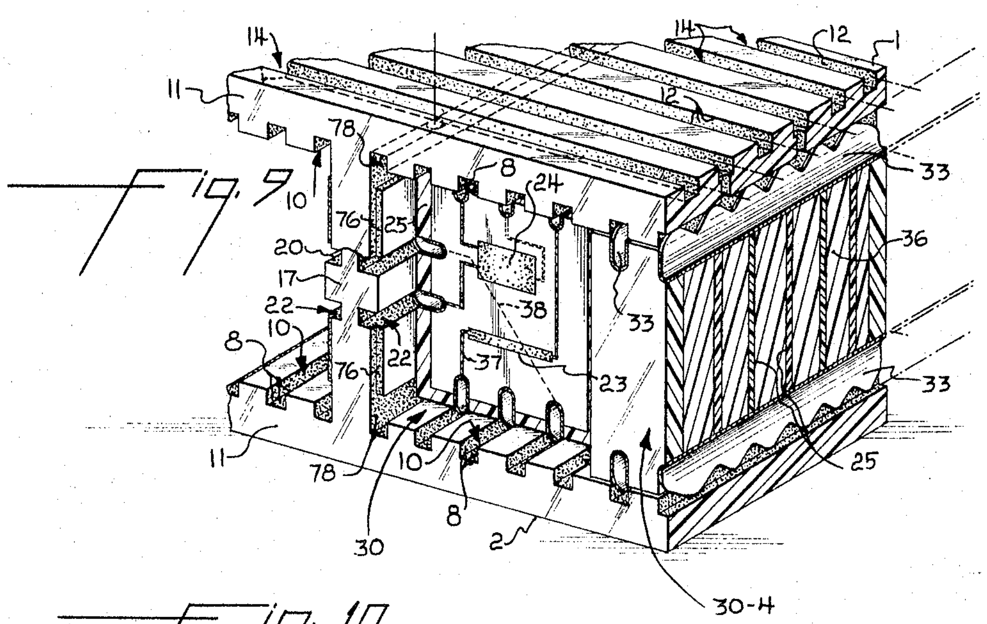
FIGURE 9 is a partial perspective view, shown greatly enlarged and broken away in section, illustrating the advantageous interconnections provided between circuit components with a plug-in micro module and the printed circuit conductors of the receptacle circuit box.

In the micro module circuit systems as shown in the drawings, the various electrical circuit components, such as miniaturized resistance, capacitance, and inductance elements, transistors, miniature diode devices, transformers, and the like, are housed within very small plug-in modules 30. Each module usually includes several of these components, as shown in FIGURE 9, which are interconnected within the module to form a functioning unit of a larger circuit assembly. Any one of these modules can be conveniently replaced by plugging a substitute module in its place.

Figures 5, 6, 7:
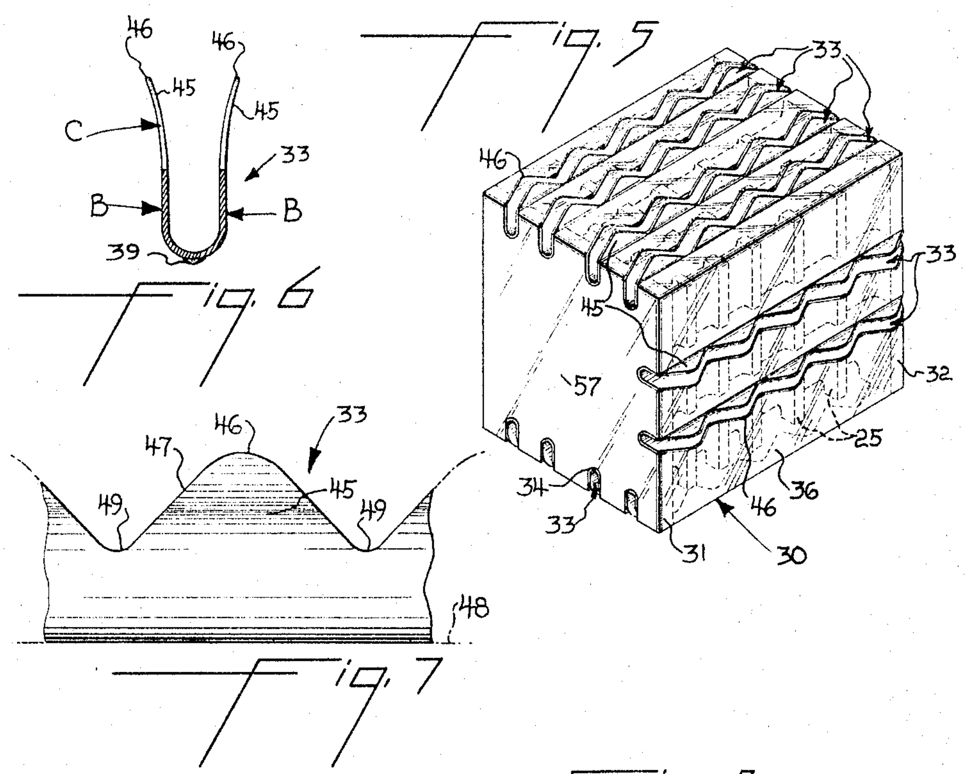
FIGURE 5 is a perspective view on further enlarged scale showing one of the micro modules which appear in FIGURE 1.
FIGURE 6 shows an end elevational view of a micro module terminal connector drawn in proportion on a scale approximately twenty times full size.
FIGURE 7 is a side elevational view of the terminal connector of FIGURE 6 and shown on the same scale as in FIGURE 6.
Figure 15:
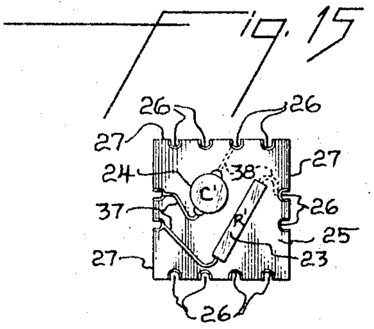
FIGURE 15 illustrates a circuit wafer which comprises one of the layers of a micro module.
Figure 10:
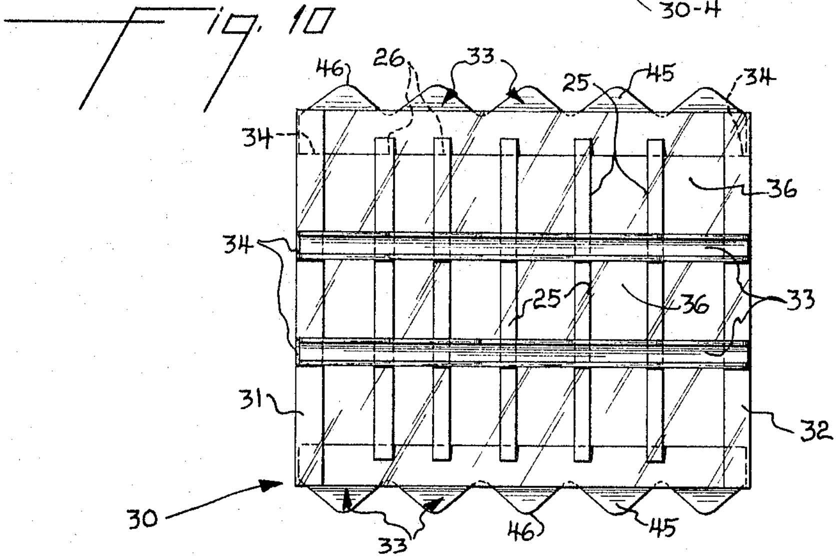
FIGURE 10 is a side elevational view, shown on greatly enlarged scale of one of the micro modules and its resilient contact connectors.

Each of these modules is built up as illustrated in FIGURES 5 and 10 from a plurality of circuit wafers, such as shown in FIGURE 15; these individual wafers form various layers within the module. These wafers each have terminal notches on their edges for providing connections between the different components in different layers and for providing connections to other modules included within the overall circuit assembly.

It is an object of this invention to provide reliable spring contact between the terminal notches of the wafers of each module and other portions of the overall circuit assembly. This reliable spring contact is provided by parallel strips of metal extending along the sides of the module and each including a multiplicity of independently acting resilient contact elements or ears. The multiplicity of resilient contact elements along each metal strip provides a redundancy of individual connections all in parallel electrical relationship and thus assuring that continuity of the connection is maintained in spite of severe and adverse environmental conditions.

Figure 1:
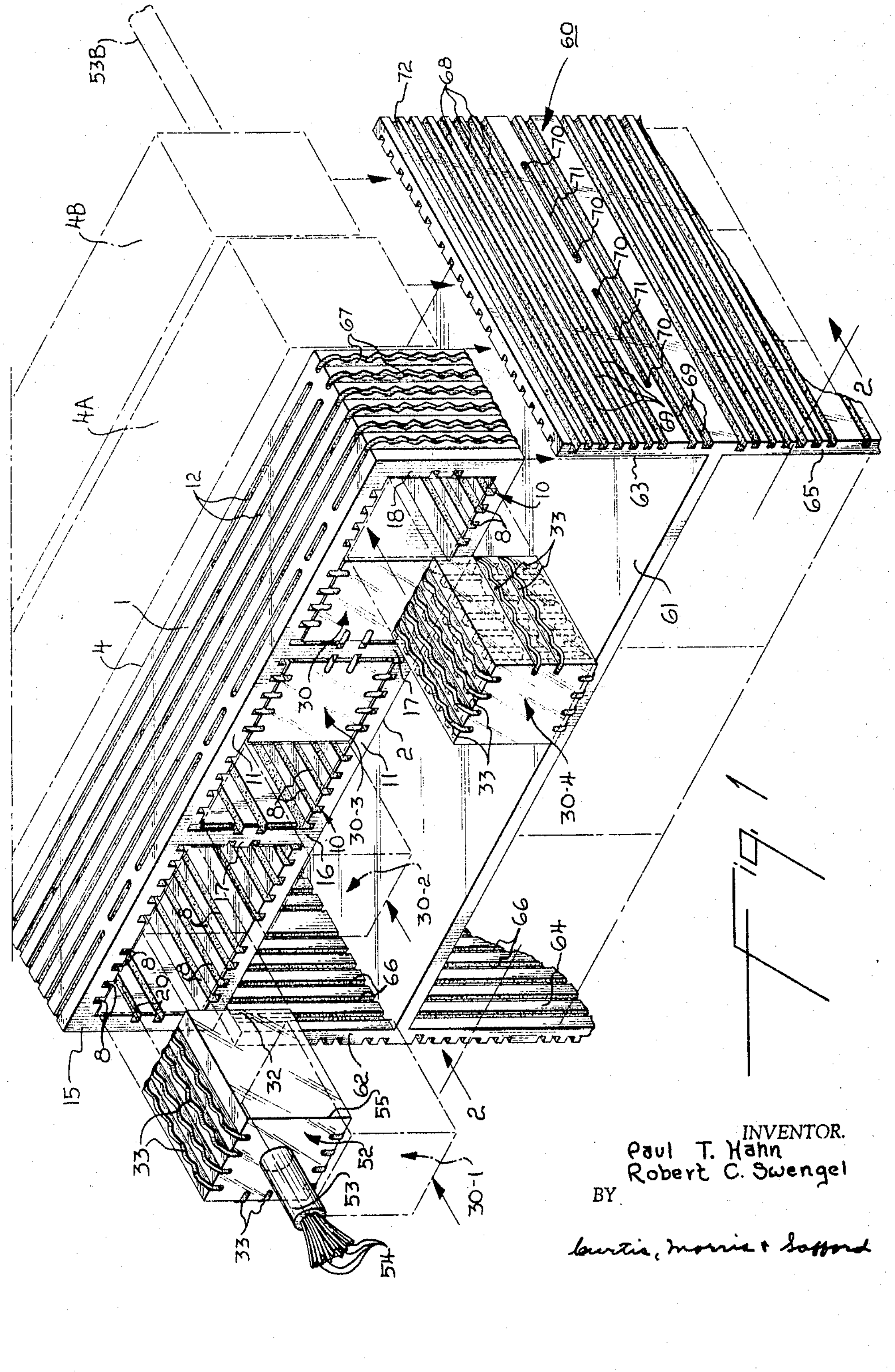
Figure 2:
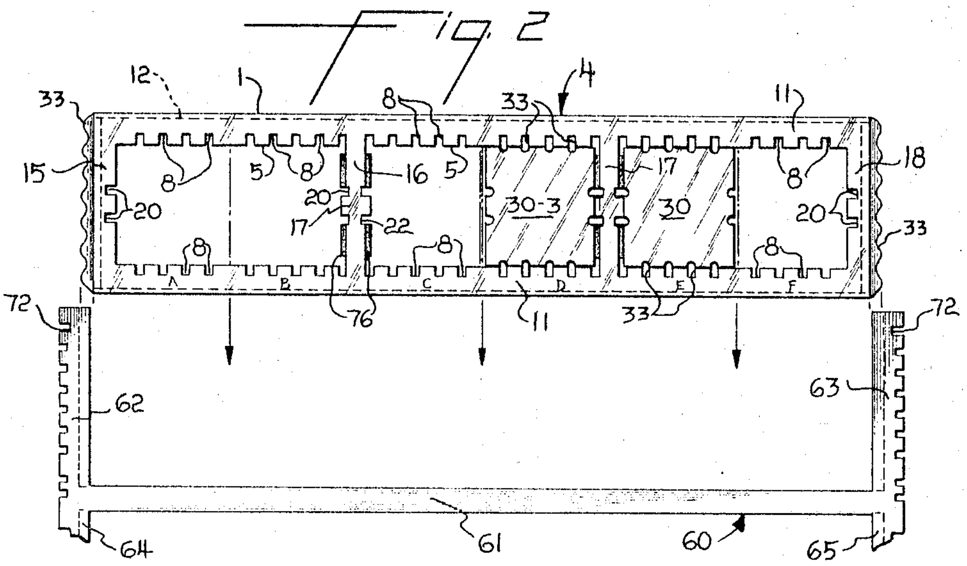
FIGURE 2 is a front elevational view taken along the line 2—2 in FIGURE 1 looking in the direction of the arrows.

In the micro module circuit system as shown in FIGURE 1, there are first and second spaced parallel support members 1 and 2 comprising the top and bottom wall areas, respectively, of a printed circuit receptacle box, generally indicated at 4. These parallel support members 1 and 2 provide a pair of spaced inner opposed faces, as indicated at 5 and 6 (please see also FIGURES 2, 3 and 9) having a plurality of printed circuit conductors 8 extending therealong. It will be appreciated that the various printed circuit conductors are insulated from one another except for certain predetermined desired points of interconnection, as explained in detail further below. In this example the support members 1 and 2 are formed from rigid sheets of insulation material, for example plastic moldable materials such as polystyrene, diallyl phthalate, or any suitable phenolic resin. Where heat dissipation is a problem, thermosetting plastics or resins will be preferred.

To protect the printed circuit conductors 8 and to provide a high level of reliability of contact, the opposed faces of the support members are provided with contact channels 10 extending back from the exposed front edges 11. The printed circuit conductors 8 are formed by strips of electrically conductive material running along the side surfaces of these channels as well as covering the bottom surfaces.

Additional printed circuit conductors 12 extend along the outer faces of the respective support members 1 and 2, lying within channels 14. These outer conductors 12 have a different orientation with respect to the front edges 11 from the orientation of the inner conductors 8 so as to enable convenient interconnection between the various inner conductors. For example, as shown the conductors 8 are perpendicular to the edges 11 while the conductors 12 are parallel therewith.

The various channels 10 and 14 can be formed by machining grooves into the surfaces of the support members 1 and 2; however, it is found advantageous to mold the entire receptacle box as an integral unit including the various channels as shown. This receptacle includes transverse wall areas 15, 16, 17 and 18 spanning across between the support members 1 and 2 and holding them rigidly in spaced parallel relationship. Printed circuit conductors 20 are shown in this example as lying along contact channels 22 in the respective transverse wall areas of the receptacle box 4.

The conductors 8, 12 and 20 are formed by suitable printed circuit techniques. For example, the receptacle box 4 is dipped into an electroless nickel or silver deposition plating solution, so as to deposit a layer of electrically conductive material over the surfaces of the box 4. The lands between the grooves or channels and other areas where no conductor is desired are then masked by coating with a resist material as is conventional in the art. A plating of copper, silver or gold is then built up electrolytically on the exposed nickel flashing to provide the conductor paths. Subsequently, the masking resist is removed, preparatory to etching away, for example, the silver or nickel flash from all surfaces except those defined by the various channels 10, 14, and 22 and by certain other recesses or holes as described in detail further below, for providing the desired interconnections.

As shown in FIGURES 9 and 15, the miniaturized electrical circuit components, such as miniaturized resistors 23 and capacitors 24 are supported by layers 25 of insulation material in the form of rectangular ceramic wafers having terminal notches 26 in their respective margins 27. It will be understood that other circuit components, not shown, such as inductance elements, transistors, transformers, and miniaturized diode devices, and the like, are also included in other similar insulation layers. These various layers 25 each including various electrical circuit components are shown in this example as being square. Each micro module, for example, the micro module generally indicated at 30 in FIGURES 5, 9 and 10, includes a plurality of these wafer layers in spaced parallel relationship with their opposite margins 27 all lined up in parallel planes.

At the front and the back end of the micro module 30 is an end plate 31 and 32, each having the same general shape as the individual layers 25 therebetween, except that these end plates are slightly larger than the layers 25. Thus, the end plates protect the wafer layers therebetween and define the size of module and the positions of its corners and edges.

For purposes of engaging a plurality of resilient contact connectors 33, which are described in detail further below, the notches 26 of all of the wafer layers within the module 30 are positioned along straight lines. In order to make connection between the resilient connectors 33 and to provide reliable spring contact connection with the various contact conductors 8, 12 and 20 these connectors 33 bear the same angular relationship with the front surface of the front end plate 31 as the respective conductors 8, 12 or 20 bear with respect to the front edges 11 of the receptacle box. The connectors 33 are shown extending back perpendicularly from the front face of the front plate 31.

There are also notches 34 in the margins of these end plates 31 and 32 and they are aligned with the respective rows of notches 26 so as to receive the ends of the resilient contacts 33. It will be noted that these end notches 34 are deeper than the intervening notches 26 so as to accommodate the larger size of the end plates 31 and 32 while still aligning the deepest points of all of these notches, as is seen clearly in FIGURE 10.

As illustrated in FIGURES 5, 9 and 10 the spaces between each of the wafer layers 25 and between them and the end plates 31 and 33 are all filled with an encapsulating material 36, for example, such as epoxy resin. An extremely satisfactory method of carrying out the encapsulation procedure while desirably protecting the extending contact legs of the resilient connectors 33 is described further below in connection with FIGURE 17.

In order to provide circuit connections among the respective circuit components 23, 24 and the like as described above, there are conductive leads 37 and 38 (please see FIGURES 9 and 15), extending along one or both surfaces of the wafers 25 to various predetermined ones of the notches 26. The leads 37 follow along one surface of the wafer 25 while the leads 38 lie along the other surface. These leads are fabricated by suitable printed circuit techniques as discussed above, and the notches 26 are lined with solder in conductive relationship with these leads.

During assembly of the micro module 30, the wafer layers 25 are supported in a jig in the spaced parallel relationship as shown between a pair of the end plates 31 and 32. Each U-shaped resilient contact connector 33 before assembly has a longitudinal bead of solder 39 continuing along the outside of the bight of the U adapted to engage and fuse with the solder lining of the notches 26. The various connectors 33 are seated in place in the notches 34 and 26 as seen in FIGURE 10 and heat is applied to fuse the solder joints between the leads 37 and 38 and the connectors 33.

Figures 3, 4:
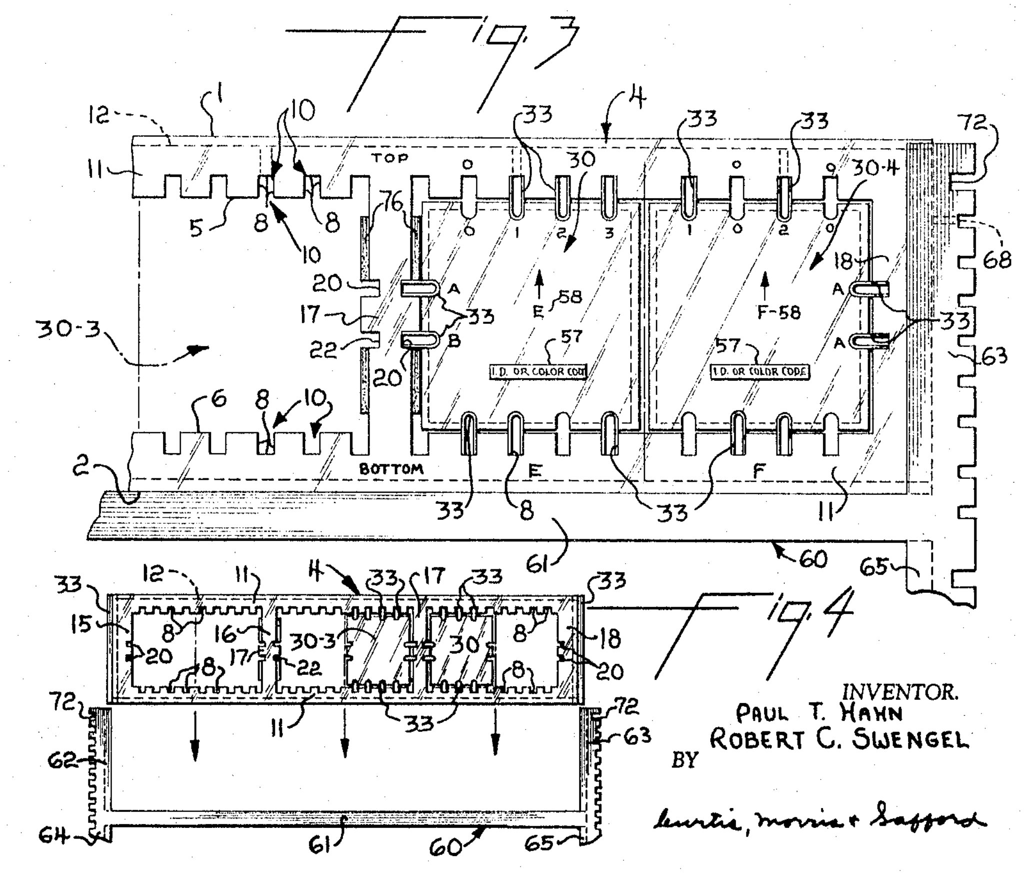
FIGURE 3 is a front elevational view, on enlarged scale, of the right end of the circuit box of FIGURES 1 and 2 as it appears when two micro modules have been inserted in operating position therein.
FIGURE 4 is an elevational view corresponding identically with FIGURE 2 but drawn on approximately full scale so as to exemplify the size of the micro modules and printed circuit receptacle and mounting.

Advantageously, the U-shaped trough formation which extends longitudinally along each of the resilient connectors 33 provides a relatively great mechanical strength for tying together the various layers of the micro module. This is extremely desirable, for the micro module is small as shown in FIGURE 4, and its structural elements are quite small. In this example, the micro module 30 has an overall length of about 0.400 of an inch as measured between the outer surfaces of the end plates 31 and 32. It has a square cross-section as seen in FIGURE 4 which measures 0.350 an inch each way.

Figure 8:
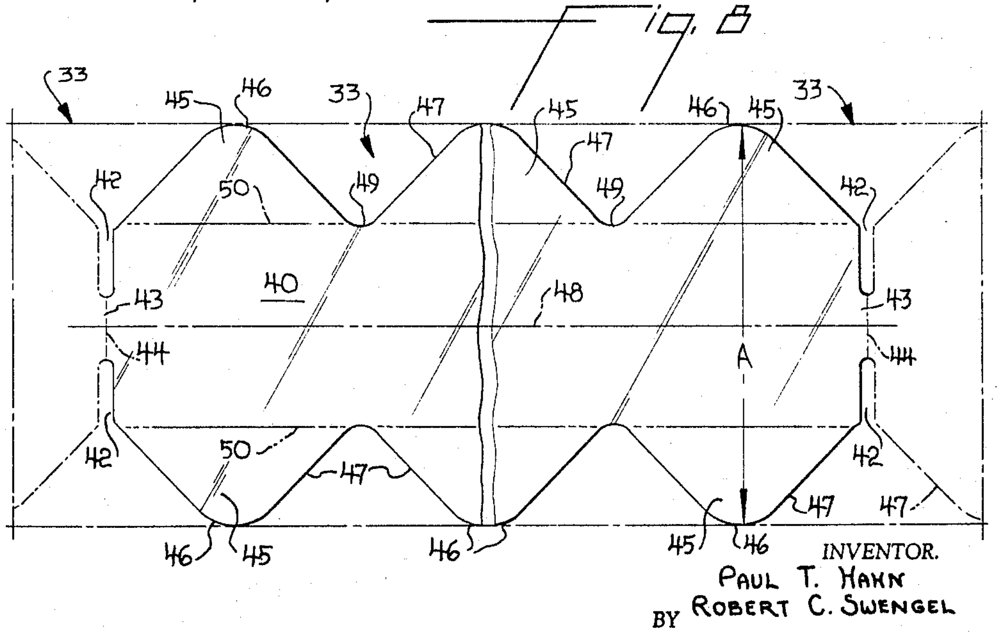
FIGURE 8 is a plan view of the flat metal blank from which this terminal connector is formed.

As shown in FIGURE 8, the resilient contact connectors 33 are formed from a thin strip 40 of resilient metal of high electrical conductivity, for example, extra hard brass having a thickness of 0.002 of an inch and an over-all width of 0.200 of an inch. Any grain of the thin strip metal due to rolling preferably extends laterally of the strip. This strip is blanked out so as to have pairs of opposed cut-off slots 42 spaced along the length of the strip at intervals just slightly less than the overall length of the micro module itself. Here, these cut-off slots are shown longitudinally spaced 0.490 of an inch on centers, leaving narrow connecting portions 43 of about ⅙ the width of the blank and which are easily severed along lines as indicated at 44.

Following blanking, there are five resilient contact elements or ears 45 extending in a row along each side of each connector 33 with a span as indicated at A of 0.150 of an inch. The ends of these ears are advantageously rounded along circular arcs 46 which are tangent to the straight sloping edge portions 47. For example, a radius of 0.025 of an inch used together with edges 47 sloping at an angle of 45° with respect to the longitudinal axis of symmetry 48 have been found to provide high levels of reliability for reasons as described below. The indentations 49 are formed by circular arcs of a radius of 0.010 of an inch also tangent to the sloping edges 47. The projecting length of each ear as measured up from the root lines 50 is 0.035 of an inch.

After the blanking operation, the strip 40 is curved along its longitudinal axis into a semi-circular trough or bight as seen in FIGURE 6. The longitudinal bands of the strip 40 which extend along just beneath the recesses 49 are brought into spaced parallel relationship, with a dimension as measured at B which is 0.023 of an inch.

In order to provide firm resilient contact, the ears 45 are curved out so that they progressively diverge toward their opposed tips. For example, in FIGURE 6 this diverging curvature of the ears 45 is defined by a radius C of 0.062 of an inch. As a result, the tips 46 as seen in FIGURE 6 are normally spaced 0.040 of an inch apart.

Thus, it will be appreciated that following the complete forming operation of the connectors 33 and their assembly into the micro module, the two rows of diverging spring contact elements or ears of each connector project outwardly and present a scalloped configuration as seen in side elevation. When the module 30 is plugged into position between the support members 1 and 2 (please see FIGURE 9) each of the side areas of the printed circuit conductors 8 and 20 lying in the contact channels 10 and 22, respectively, are engaged at a multiplicity of contact points by the edges 46 of the ears 45.

Thus, advantageously, a plurality of areas of contact are created in parallel electrical relationship between each connector 33 and each of the printed circuit conductors 8 and 20. In this example, there are ten such contact areas for each of the plug-in connections. Even if for some unforeseen reason, some of these contact areas along one connector 33 should open, nevertheless the desired circuit continuity would be operably maintained. It will be appreciated that this construction provides an extremely high level of reliability of maintaining circuit continuity between the circuit components such as at 23 and 24 and the printed circuit conductors 8 and 20.

For purposes of explaining the many advantages of this example, assume that the receptacle box 4 is associated with equipment mounted in a vehicle and is being subjected to violent vibrational motion in the endwise direction of the box. That is, the vibrations are perpendicular to the lengths of the individual connectors 33. The ears 45 are highly resistive to deflection by inertial forces because of the relatively short projections of the ears above the surfaces of the encapsulation material 36, as seen in FIGURE 10. The projecting length of the ears is somewhat less than their height above the root lines 50, for the indentations 49 are slightly buried beneath the material 36. Thus, anything less than a very violent shaking will not cause any of the ears to momentarily spring out of contact with the printed conductors 8 or 20.

Even if the vibration were so violent as to cause inertial forces to overcome the resilience of the five ears 45 along one leg of the connector, causing them momentarily to lose firm contact with the adjacent conductive side areas 8 or 20 of one of the channels 10 or 22, the other five ears along the other leg of this same connector would be pressed into contact with even greater pressure because of the same inertial forces. Thus, ordinary or violent vibrations do not cause these scalloped edged resilient contact connectors to become open circuited.

There are a multiplicity of contact areas along each connector 33 all operating in parallel electrical relationship and any one of which will maintain circuit continuity for its circuit. Moreover, half of the ears on any given connector are resiliently urged in one direction and the other half in the opposite direction. Therefore, vibrational or acceleration forces do not tend to open up more than one-half of the contact areas of any connector, while at the same time they tend to close the other half of the contact areas more tightly.

It will be understood that even complex spinning acceleration motions cannot open up all of the contact areas along any given connector, because any axis of spin passing at any angle through any connector 33 will find one or more of the ears 45 acting in opposite directions with respect to the direction of spin. Moreover, the tips of the curved edges 46 are available also for making contacts with the conductive material extending along the bottom of each of the channels 10 or 22 if desired.

We find that it is preferable to depend primarily upon the engagement of the resilient contact ears 45 with the conductive side walls of the respective contact channels for completing the connections. There are a number of advantages in this relationship, some of which have been discussed above. Another advantage results from the fact that the planes of these conductive areas extend generally perpendicularly with respect to the sides of the module. Thus, a relatively great tolerance is obtained for variations in size of the various micro modules. When the modules are smaller than the desired size as specified, then the result is not to cause failure of the equipment. Instead, the undersized modules are fully operable because the individual contact ears 45 are enabled to engage portions of the individual channels 10, 14 and 22 which are spaced somewhat farther from the bottom of the respective channels than in the case of standard size modules. In the case of oversized modules, the system still remains fully operable because the individual contact ears 45 are enabled to engage portions of the individual channels 10, 14 and 22 which are located somewhat more closely to the bottom of the respective channels than in the case of standard size modules.

Thus, advantageously, the tolerance for variations in width or height of the module is substantially equal to the depth of the respective contact channels. In cases where the module is held positively centered in spite of external forces, then this tolerance is substantially equal to twice the depth of the respective channels.

At the time of inserting a micro module 30 into the receptacle box 4, the sloping edge portions 47 helpfully provide a "lead" for guiding each successive ear 45 as it encounters the front end of a channel 10 or 22. In this way the respective opposed ears 45 are individually cammed toward each other into a more nearly parallel relationship as seen in end elevation in FIGURE 3 as the connectors 33 slide endwise into the respective contact channels.

As shown in FIGURE 1, the spaced support members 1 and 2 together with the transverse walls 15, 16, 17 and 18 define a box receptacle adapted to receive six plug-in module units each having parallel rows of the resilient contact connectors 33. In this example the plug-in unit 52 at the left end is shown as being in the form of a plug for making connections to associated equipment. This plug has an electric cable 53 connected thereto and including a plurality of separately insulated wires 54. Within the plug 52 each of the wire 54 is connected to a different one of the ten resilient contact connectors 33. Thus, by inserting the plug 52 an external connection is provided from each one of the wires 54 to each one of the ten printed circuit conductors. There are four conductors 8 along the face 5 and four conductors 8 along the face 6 with two more conductors 20 being shown along the transverse wall 15.

Plug 52 may simply comprise a block providing support for the associated connectors 33 and a front end plate 55 which has a central opening to accommodate the cable, and room is provided immediately behind this front plate 55 for the inner ends of the various wires 54 to reach each of the connectors 33.

Into the remaining five available spaces of the receptacle box 4 are inserted five micro modules 30–1, 30–2, 30–3, 30 and 30–4. Each of these is identical in construction with the module 30 shown in FIGURES 5, 9 and 10, except that the arrangement and characteristics of the electrical components in the various wafer layers 25 are widely different as required by the different electrical functions and operations carried out by each module. The two modules 30–3 and 30 are illustrated as already plugged into position, and the module 30–4 is ready to be inserted. The modules 30–1 and 30–2 are indicated in dot-and-dash outline for clarity of illustration and are also ready to be inserted.

Suitable legends 57 and identifying symbols 58 and colors, as shown in FIGURES 3 and 5, may be applied to the front end plate 31 of each module if desired for ease of servicing and maintenance.

In order to mount the receptacle box 4, a module pack mounting 60 is provided having a generally H shape as seen in front elevation. This pack mounting includes a central web 61, a first pair of opposed spaced parallel support members 62 and 63 above the web 61 and a second pair of opposed spaced parallel support members 64 and 65 below this web 61. Each of these support members includes printed circuit conductors 66 lying in channels and adapted to be engaged by the six resilient contact connectors 67 extending vertically along both ends of the box 4.

This module pack mounting 60 has a front-to-back depth as illustrated of 1.500 inches and so is adapted to receive three receptacle boxes 4, 4A and 4B, as indicated in FIGURE 1. Thus, a total of eighteen modules are supported above the web 61, and eighteen more modules can be conveniently supported beneath the web 61 in three similar receptacle boxes.

Interconnections as desired among the various channel conductors 66 are provided by horizontally extending printed circuit cinductors 68 which are protected within channels in the outer surfaces of the support members 62, 63, 64 and 65. Holes such as shown at 69 and 70 are lined with the conductive plating material and complete the circuits between opposite surfaces of these support members. The conductors 71 are shown as short interconnections or "jumpers" between sets of holes 70 for feeding in and taking out electrical signals. However, the longer conductors 68 in some instances join three of these holes 69, for example, to provide a common return or "ground" connection for several of the conductors 66 or a common power source for several of the conductors 66, or other common connection. Others of the conductors 68 can also be used to transmit the signals between various ones of the conductors 66, depending upon the desired operation.

For maintenance, it is a convenient and easy matter to unplug a receptacle box such as the box 4A from its mounting 60 and then to replace one of the modules therein.

The uppermost groove 72 is made deeper than the other channel conductors for purposes of engaging a cover (not shown) which can be slid over the tops of the receptacles 4, 4A, and 4B so as to protect them from dust, as will be understood.

Figures 11, 12:
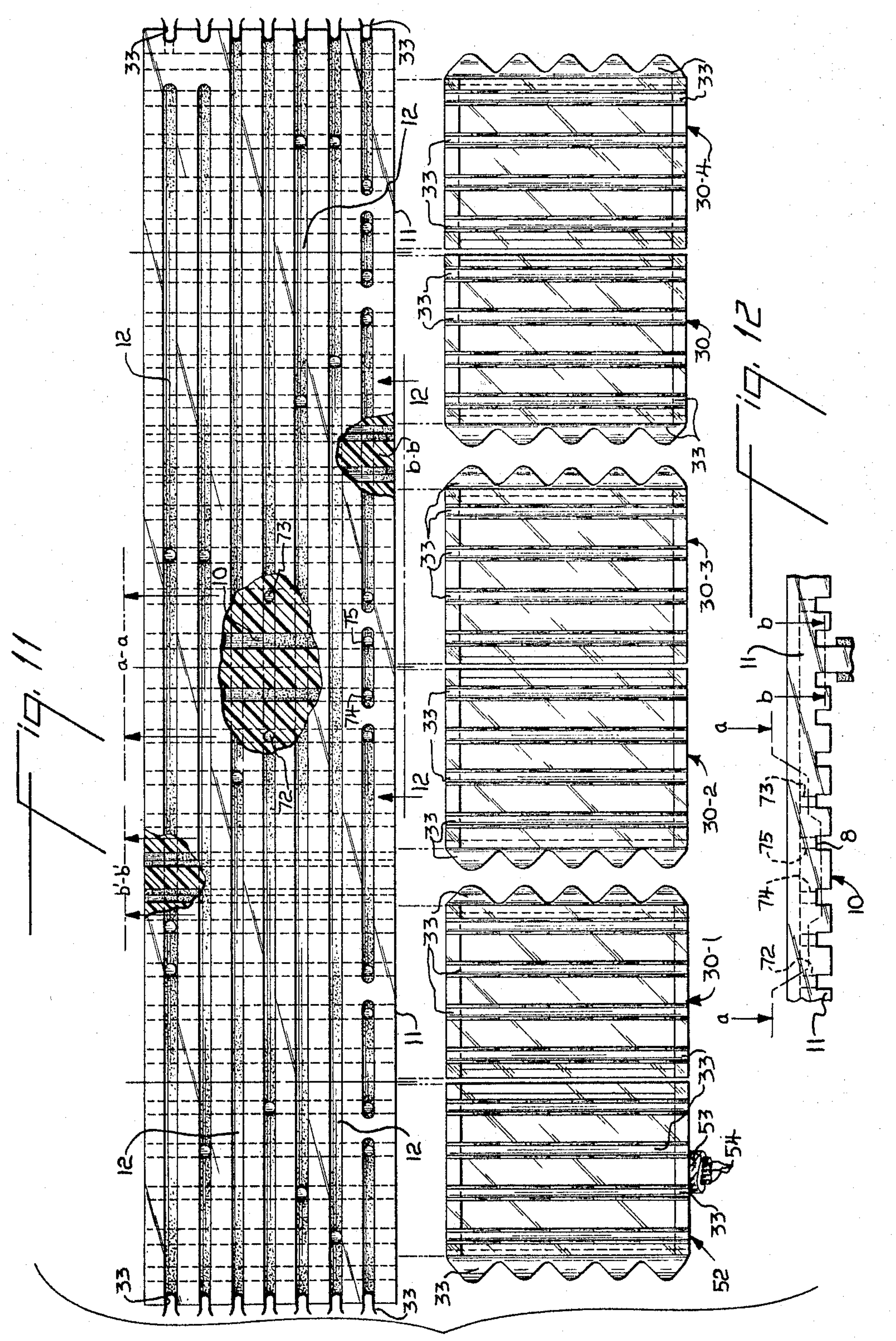
FIGURE 11 is an exploded plan view on enlarged scale of the printed circuit receptacle box of FIGURE 1 including five micro modules and the interconnection plug unit at the left.
FIGURE 12 is an elevational view showing the construction of the sectional areas *a—a* and *b—b*.

In the exploded view of FIGURE 11 is clearly illustrated an advantageous arrangement of the conductors 12 which interconnect the various conductors 8 as well as making connections with the receptacle-end connectors 67 which engage in the conductor channels 66. These receptacle-end connectors 67 are identical with the module connectors 33 except that the connectors 67 are longer. As seen in FIGURE 11, some of the various conductors 12 are short to provide "jumper" connections, while others extend most of the length of the receptacle. The connections down through to the conductors 8 are provided by the various holes such as at 72, 73, 74 and 75.

For providing connections (please see FIGURES 3 and 9) from the conductors 20 in the channels on the transverse walls 15, 16, 17 and 18, and the remainder of the circuits, the vertical corners of these various transverse walls are rabbeted. Conductive plating 76 extends along the depressed areas of the rabbeted corners to the conductive plated channels 78 which in turn connect with the conductors 12 in the manner explained above.

Figure 13:
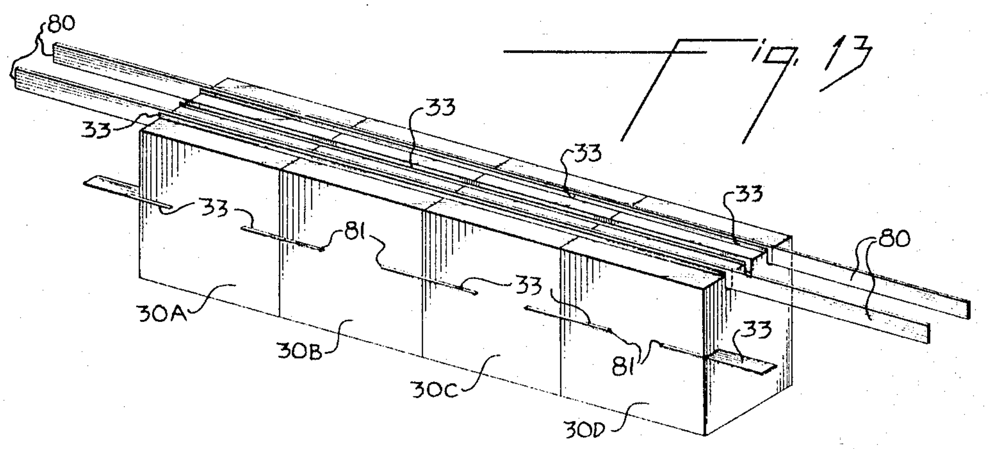
FIGURE 13 shows an assembly of micro modules arranged in a line end to end.

In FIGURE 13 another advantage of the U-shaped connectors 33 is shown. A series of micro modules 30A, 30B, 30C, and 30D are joined in end-to-end relationship by electrically conductive strips 80 secured into the respective troughs of the connectors 33 by press fit or soldering. Short strips 81 of conductive material may be used to make short "jumper" connections between other connectors 33.

Figure 14:
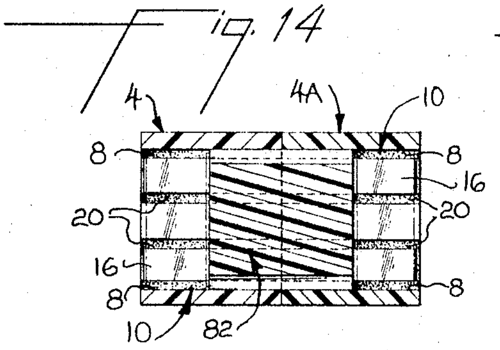
FIGURE 14 illustrates further method and apparatus for interconnecting adjacent receptacle circuit boxes so as to tie them together.

In order to understand the advantages of the twin-box connector unit shown in FIGURE 14, attention is again directed to FIGURE 1 to the center box 4A which is adjacent to the box 4. In certain circuit arrangements it may be desired to interconnect the two boxes directly by a module unit plug 82 which is inserted part way into each box 4 and 4A so as to interconnect the various conductors 8 and 20.

Figure 16:
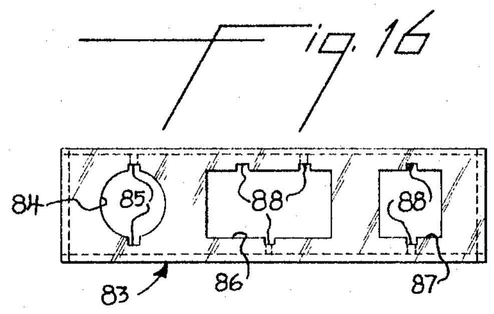
FIGURE 16 is an end elevational view of a modified printed circuit receptacle block adapted to receive modules or components of various configurations.

FIGURE 16 is an end elevational view of a modified printed circuit receptacle box 83 having a circular receptacle opening 84 adapted to receive a cylindrical resistor having its two terminal end leads each bent back in parallel relationship along opposite sides of the wall of the resistor and engaging in the opposed conductively plated channels 85. Circuit components of other configuration are received in the receptacles 86 and 87, their terminals making contact with the conductively plated channels 88.

Figure 17:
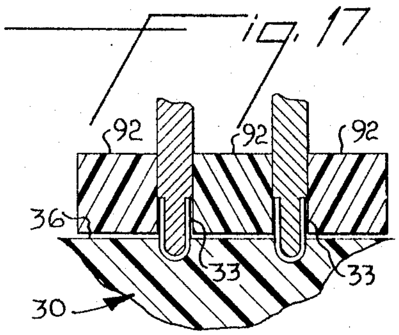
FIGURE 17 illustrates a method of encapsulating a micro module.
Figure 6A:
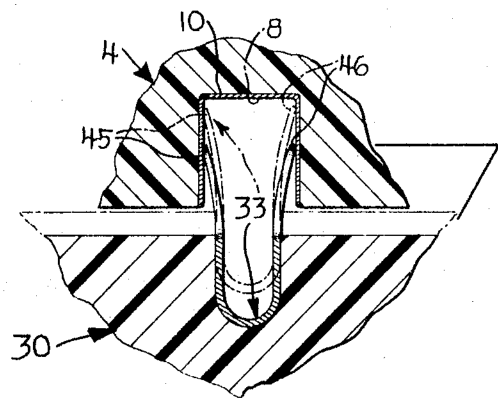
FIGURE 6A shows an end elevational view on greatly enlarged scale of the engagement of one of the terminal connectors with the opposite side walls of a contact channel.

When the module 30 is being encapsulated, as shown in FIGURE 17, protective strips 90 are inserted into the troughs of the connectors 33. Clamp elements 92 of the mold press the ears of these connectors 33 against the side faces of the protective strips which are rounded on their edge so as to conform with and protect the trough of the connector 33. Thus, the desired surface of the encapsulation material 36 is clearly defined by the mold elements 92. This material is positively prevented from covering the projecting ear portions of the connectors.

Figure 18:
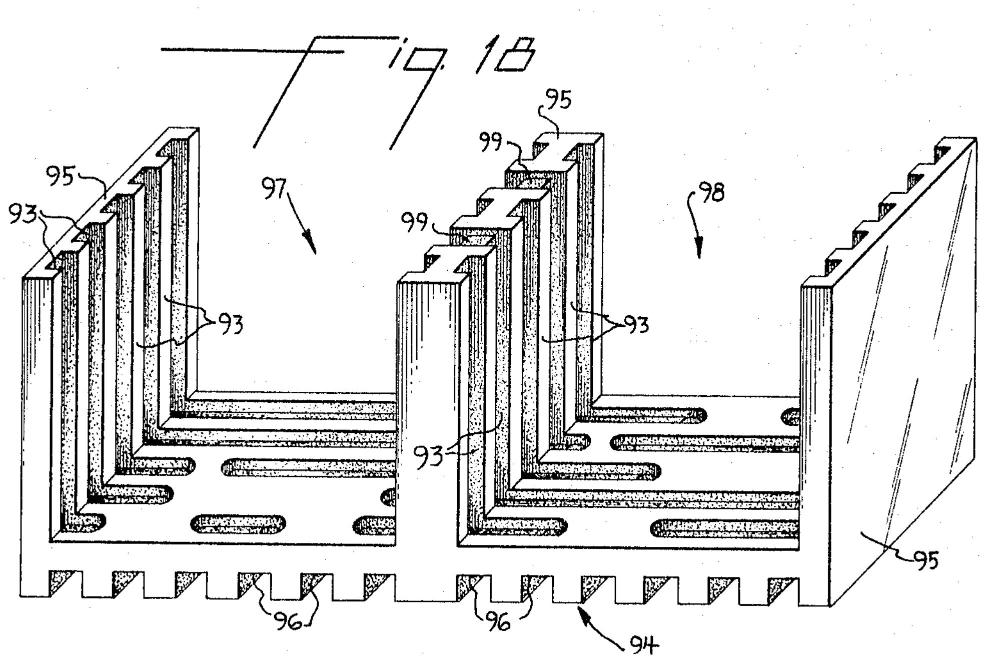
FIGURE 18 is an enlarged perspective view of another modified printed circuit receptacle box adapted for fabrication from plastic by straight compression molding.

In FIGURE 18, the printed circuit receptacle box 94 is shown as having three spaced parallel support members 95 with smooth outer end surfaces on the two outer support members. The interconnections between the printed circuit conductors 93 are provided by the conductively-coated channels 96 on the bottom transverse wall. It is noted that this box 94 is adapted to receive one module in each of the receptacle openings 97 and 98. Additional connections are made through the depressed areas at 99. By virtue of this open box construction as shown with smooth end walls, straight compression molding is enabled to be used in its fabrication.

Figures 19, 20:
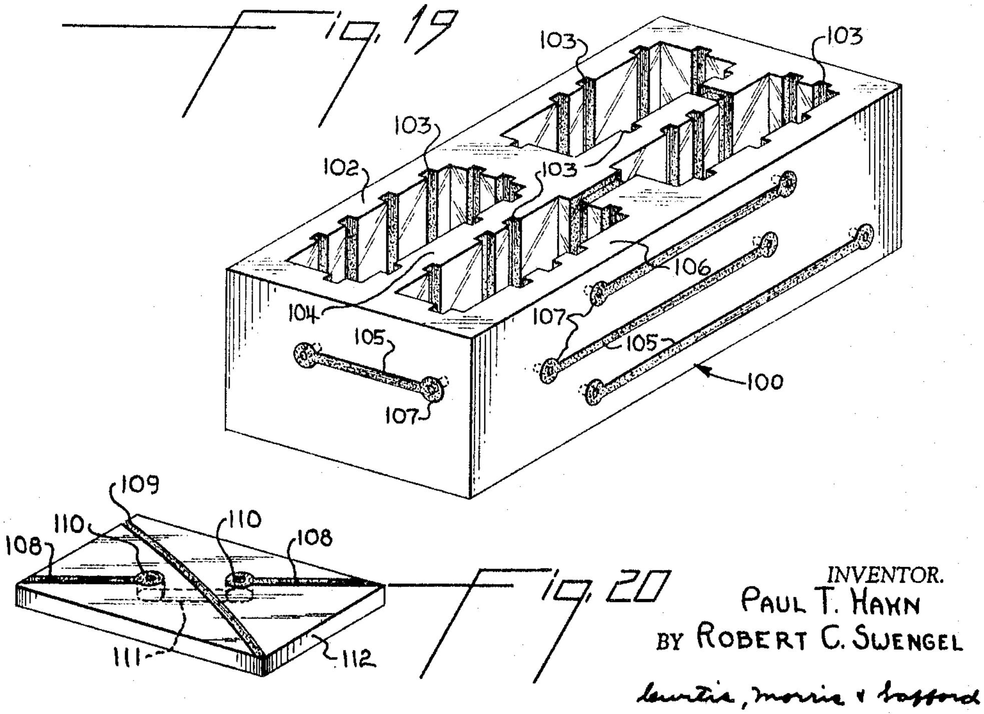
FIGURE 19 is a further modified printed circuit box adapted for fabrication from plastic by straight compression molding.
FIGURE 20 illustrates a method of crossing printed circuit conductors which are insulated from one another.

Similarly, in FIGURE 19, the receptacle box 100 is adapted to be made by straight compression molding. This box 100 is adapted to receive four modules and includes three spaced parallel support members 102, 104 and 106. Circuit interconnections between the various conductor lined channels 103 may be provided by printed circuit strips 105 and lined holes 107 formed by suitably masking the outside surface of box 100 during the conductor formation as above described.

As shown in FIGURE 20, a printed circuit conductor 108 bypasses another conductor 109 by following through a pair of holes 110 and progressing a short distance along a jumper channel 111 in the opposite surface of a support member 112, which is illustrative of an alternate way of providing interconnections between conductor channels 93, support member 112, for example, comprising the bottom transverse wall of box 94 (FIGURE 18).

Figures 21, 22, 23:
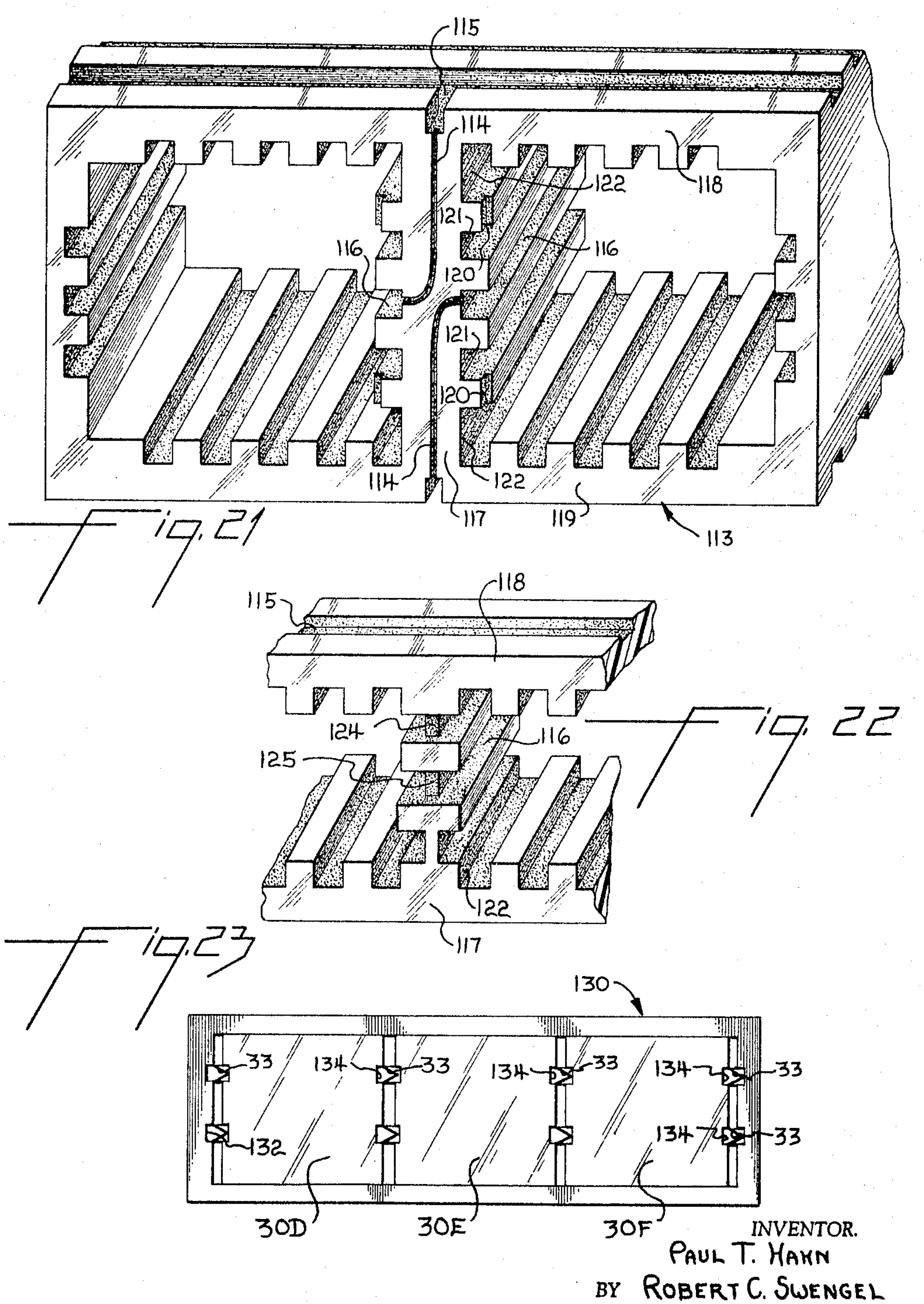
FIGURES 21 and 22 are partial perspective views on enlarged scale of still other printed circuit receptacles showing methods of interconnection between various conductors.
FIGURE 23 is a front elevational view of a module-to-module method of assembly utilizing printed circuit conductor channels and resilient contact connectors.

In FIGURE 21, is shown a receptacle box 113 having interconnections 114 between pairs of printed circuit conductors 115 and 116, respectively. These interconnections 114 are provided by conductively coated channels cut into the edge of a transverse wall 117 spanned between the support members 118 and 119. Also, rabbeted depressions at 120 provide connections between adjacent pairs of parallel conductors 121 and 122.

In FIGURE 22 interconnections are provided by conductively coated depressed areas 124 and 125.

In FIGURE 23, the receptacle box 130 has conductively coated contact channels 132 at one end and resilient connectors 33 at the other end. Similarly, each of the micro modules 30D, 30E and 30F have contact channels 134 and resilient connectors 33 along opposite sides, thus enabling side-by-side assembly of interconnected modules.

As described, each module 30 may be encapsulated or potted if such is desired. For some purposes, however, the mechanical strength of the series of ceramic wafers and rod-like connectors 33 constituting the module structure will suffice whereby encapsulation may be omitted which is further advantageous in that better circulation of cooling fluid can be achieved. Where the heat generated within the system, and its transfer out of the system, is a serious problem, the present invention affords an easy solution in that each of the assemblies, or subassemblies contained within a receptacle box may be supported, hermetically sealed for example, in an oil-filled can (not shown) which, if of metal, advantageously completely electrically shields the circuitry involved. Again, module encapsulation may be omitted if the nature of the electrical components on the wafers will admit of contact by oil.

From the foregoing it will be understood that the systems, module connectors, methods and apparatus of the present invention described above are well suited to provide the advantages set forth, and since many possible embodiments may be made of the various features of this invention and as the method and apparatus herein described may be varied in various parts, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features, all without departing from the scope of the invention.

We claim:

1. An electrical circuit system comprising a pair of spaced parallel support members having opposed parallel surfaces, a module having a pair of spaced parallel surfaces fitting between said support members, the respective surfaces of said module being closely adjacent to the respective surfaces of said support members, a plurality of parallel electrical interconnections between said module and at least one of said support members, each interconnection including a connector element extending along a channel in at least one of said adjacent surfaces and an elongated contact element projecting into said channel and engaging said connector element at a plurality of contact areas spaced along the length of the contact element, one of the connector and contact elements being laterally resilient relative to the sidewalls of the channel so that the elements engage under spring pressure.

2. An electrical circuit system as claimed in claim 1 and wherein said connector element extends along opposite walls of said channel, said contact element including parallel rows of resilient ears resiliently pressing outwardly against said opposite walls.

3. An electrical circuit system comprising a support member having opposed spaced surfaces, a module having a pair of spaced surfaces fitting between the surfaces of said support member, the respective surfaces of said module being closely adjacent to the respective surfaces of said support member, a plurality of parallel electrical interconnections between said module and at least one of the surfaces of said support member, each interconnection including a connector element extending along a channel in at least one of said adjacent surfaces and an elongated contact element projecting into said channel and engaging said connector element at a plurality of contact areas, one of the connector and contact elements being laterally resilient relative to the sidewalls of the channel so that the elements engage under spring pressure.

4. An electrical circuit system comprising a support member having at least one contact channel extending along a surface thereof, electrically conductive material extending along opposite side walls of said channels forming a pair of opposed elongated contact areas, electrically conductive means interconnecting said pair of contact areas to provide a single contact, a circuit module having a side surface closely adjacent to said surface of the support member, a strip of metal extending along the surface of said module and having a plurality of contact elements projecting therefrom, said contact elements being resilient and being at least partially separated one from another, thereby providing substantially independently acting spring contact elements, said spring contact elements projecting into said contact channel, respective ones of said spring contact elements being biased in opposite directions toward engagement with said conductive material along opposite side walls of said channel, and the end of said channel being open for endwise withdrawal of said metal strip when said module is removed from its position adjacent to said support member.

5. An electrical circuit system comprising a support member having at least one contact channel extending along a face thereof, electrically conductive material extending along opposite side walls of said channel forming a pair of opposed elongated contact areas, electrically conductive means interconnecting said pair of contact areas to provide a single contact, a circuit module having a side surface adjacent to said face of the support member, a strip of metal extending along the surface of the module and having a generally U-shape as seen in end elevation with the two legs of the U-shape comprising the two long edges of the strip, each of said edges comprising a row of independently acting resilient contact elements, said two rows of resilient contact elements projecting into said contact channel, the two rows of said resilient contact elements being biased outwardly away from each other and toward engagement with said conductive material at a plurality of contact points along opposite side walls of said channel, and the end of said channel being open for endwise withdrawal of said U-shaped metal strip when said module is removed from its position adjacent to said support member.

6. An electrical circuit system comprising a pair of spaced parallel support members having opposed spaced parallel faces, a module having a pair of spaced parallel surfaces fitting between said support members, the respective surfaces of said module being closely adjacent to the respective faces of said support members, the faces of said support members each having a plurality of parallel channels therein with conductive material on the side wall, the ends of said channels being open, a plurality of parallel strips of metal extending along said surfaces of the module, each of said strips having a plurality of contact elements positioned along its length, said contact elements being resilient and projecting generally away from the surface of the module, the contact elements along each strip being at least partially separated one from another, thereby enabling significant independent resilient deflection of each contact element with respect to the other contact elements along the strip, the contact elements of respective strips extending into said channels and engaging the conductive side wall material for providing a plurality of parallel electrical interconnections between said module and the conductive side wall material.

7. An electrical circuit system as claimed in claim 6 and wherein the conductive material extends along both of the side walls of each channel and the contact elements engage both side walls of each channel.

8. An electrical circuit system as claimed in claim 7 and wherein each strip includes a first plurality of contact elements resiliently biased toward engagement with one side wall and a second plurality of contact elements resiliently biased in the opposite direction toward the other side wall.

9. A module containing electrical components and being adapted to be plugged into connection with an electrical system, said module comprising insulation wafers defining a plurality of layers each having first and second parallel opposed edges, said layers being in parallel planes with said first and second edges respectively lying in first and second spaced parallel planes, said first and second edges having notches therein which are aligned in their respective planes, at least one electrical circuit component being included in each of said layers, electrical connections extending from the circuit component in each layer to at least one of said notches, a plurality of conductive metal strips, each of said strips extending along one of said planes and being seated in said notches, each of said strips including a plurality of resilient contact elements at spaced positions along its length and extending outwardly from the plane of the adjacent edges and being adapted to make a plurality of external electrical connections.

10. The method of assembilng a micro module adapted for use in electrical systems for a plurality of rectangular insulation wafers each of which carries one or more electrical components and has notches in its edges providing electrical terminals for said components comprising the steps of supporting the wafers in spaced parallel relationship with the respective notches on opposite edges aligned, forming a plurality of thin strips of resilient electrically conductive metal into a U-shape with the bight of the U extending longitudinally of each strip and dividing the edges of each strip into a plurality of contact ears, securing the convex surface of the U-shaped strips into the aligned terminal notches in electrically conductive relationship therewith, thereby interconnecting and supporting said wafers, inserting protective members into the bight of each U-shaped strip and applying clamping members against the contact elements and pressing them against opposite surfaces of the respective protective members, said clamping members circumscribing the desired size of the module, injecting encapsulating material into the circumscribed space within said clamping members for filling the spaces between said wafers, hardening said encapsulating material, and removing said clamping and protective members.

11. An electrical circuit system comprising a pair of panels of insulation material supported substantially in parallel disposition, a plurality of channels on the inside opposed surfaces of said panels, a conductive lining on the side walls of said channels, printed circuitry on the outside surface of at least one of said panels, means conductively connecting the lining on the channels to said printed circuitry, at least one electrical component disposed between said panels, metallic spring elements resiliently pressed between said side walls in contact with said lining and coupled to the leads of said component for frictionally maintaining the component between the panels and electrically connecting said leads to said lining.

12. An electrical circuit system according to claim 11 wherein said spring elements are substantially U-shaped and carried by said components, the legs of the U being compressed between said side walls.

13. A system for interconnecting modular circuit units comprising a pair of spaced parallel side walls each having circuitry lines on at least one surface, a plurality of module blocks fitted in a row between said side walls and incorporating the electrical components of said units, a plurality of contact paths on the facing surfaces of said side walls selectively connected with said lines, said contact paths being insulatingly spaced from said circuitry lines except at the points of selective connection, plural contact elements on opposed surfaces of said blocks connected to the electrical components therein, said contact paths and contact elements comprising the mating parts respectively of a series of two-part slide-fit frictional connectors extending laterally of the side walls for independent insertion and removal of the module blocks, the module blocks being interconnected by said lines through said connectors on both side walls.

14. A system for interconnecting modular circuit units comprising a pair of side walls each having printed circuitry on at least one surface, means for supporting said side walls parallel to each other, a plurality of module blocks fitted between said side walls and incorporating the electrical components of said units, a plurality of spaced parallel channels in the facing surfaces of said side walls, a plurality of two-part slide-fit frictional contacts, one part of each contact residing in and along the side walls of said channels respectively and connected to said circuitry, the mating parts of the contacts being mounted on the sides of said module blocks and being connected to the components therein, each of said mating parts having engaging means laterally biased relative to said side walls to engage the opposite sides of a channel at a plurality of points along its length.

15. A system for interconnecting pluggable modular circuit units comprising a pair of spaced parallel side walls having printed circuitry thereon, the circuitry on said side walls extending on the exterior sides along longitudinal lines, a row of component module blocks receivable between and having opposed side surfaces disposed closely adjacent the interior sides of said side walls, a plurality of parallel electrical interconnections between each of said module blocks and side walls, each interconnection including a contact path extending laterally of a side wall and a contact element on the side surface of a module block, said contact path and contact element including a spring pressure interengaging portion and being the mating parts of a slide-fit frictional connector, said side walls having apertures for selectively admitting therethrough means for connecting the printed circuitry thereon to each contact path, any one contact element on either side of the row of blocks thereby being connectable to any other contact element on the same side via the printed circuitry on the adjacent side wall.

16. A module block for sliding reception in a wiring framework of a modular circuit system comprising a block of insulating material incorporating the electrical components of a modular unit, a plurality of spaced parallel metallic spring contact strips supported on two opposite exterior sides of said block, each of said strips being generally channel-shaped with the channel sides having laterally acting spring elements arranged for telescopic engagement with a mating contact carried by the framework, the contact strips each having means for connection with the components of the unit, the electrical components of said modular unit being disposed between the contact strips thereof.

17. A module block for sliding reception in a wiring framework of a modulator circuit system comprising a block of insulating material incorporating the electrical components of a modulator unit, a plurality of similar elongated contact elements extending in parallel along and substantially the length of at least one side of said block, each element having a substantial width perpendicular to said side including plural contact engaging portions acting parallel to said side whereby said element constitutes one part of a contact channel and slide-fit telescoping channel insert connector assembly for cooperation with a mating part carried by the framework, the leads of the components being connected to said contact elements.

18. A module block according to claim 17 wherein each contact element includes means for engaging the mating part under spring pressure at a plurality of independent points.

19. A system for interconnecting modular circuit units comprising plural subframes each having a pair of spaced side walls along which extends a plurality of circuit lines, a string of module blocks slidably received within each subframe, means on said module blocks and said side walls for selectively providing circuit continuity between said circuit lines and the electrical components of the module blocks, a carrier frame having a pair of walls slidably receiving therebetween subframes in side-by-side relation, circuit paths on each said walls, and means on said frame and subframes for selectively providing circuit continuity between circuit lines and circuit paths.

20. An electrical circuit system comprising a pair of spaced parallel support members having opposed parallel surfaces, a module having a pair of spaced parallel surfaces fitting between said support members, the respective surfaces of said module being closely adjacent to the respective surfaces of said support members, a plurality of parallel electrical interconnections between said module and at least one of said support members comprising a printed circuit conductor extending along opposite walls of a channel in at least one of said adjacent surfaces and a resilient electrical connector having a U-shape as seen in end elevation engaging said conductor at a plurality of contact areas spaced along the length of the conductor, said connector including parallel rows of resilient ears resiliently pressing outwardly against said opposite walls, said ears having a scalloped configuration at the projecting edges of the connector.

21. For use in interconnecting the modules of a modular circuit system, a panel having circuitry lines extending along one side, a module block mounted with one side disposed closely adjacent a side of said panel, a plurality of parallel elongated connector assemblies between the opposed sides of said panel and block for interconnecting the circuitry lines and the electrical components incorporated in the block, each assembly including a contact channel part and a channel insert part slidably engaged in the channel part, one of said contact channel and channel insert parts being disposed on said panel and extending across and selectively connected to said circuitry lines, the other of said parts having means laterally resilient relative to the channel part side walls for spring pressure engagement with the other part.

22. For use in interconnecting the modules of a modular circuit system, a circuit unit including a panel having circuitry lines extending along one side, a module mounted with one side disposed closely adjacent a side of said unit, a plurality of parallel elongated connector assemblies between the opposed sides of said unit and module for interconnecting the circuitry lines and the electrical components associated with the module, each assembly including a contact channel part and a channel insert part slidably engaged in the channel part, one part of said assembly being mounted on said unit in connection with a circuitry line on said panel, the other part of said assembly being mounted on said module for connection with a component of the module, said assembly having means laterally resilient relative to the channel part side walls for effecting spring pressure electrical engagement between said parts.

23. For use in interconnecting the modules of a modular circuit system, a circuit unit including a panel having a circuitry line extending along one side, a module sildably movable relative to said unit so that a side of said module is brought into adjacent opposed relation to a side of said unit, a plurality of parallel elongated connector assemblies between the opposed sides of said unit and module for interconnecting the circuitry lines and the electrical components associated with the module, each assembly including a contact channel part and a channel insert part endwise slidably engaged in the channel part, one part of said assembly being mounted on said unit in connection with a circuitry line on said panel, the other part of said assembly being mounted on said module for connection with a component of the module, said assembly having means laterally resilient relative to the channel part side walls for effecting spring pressure electrical engagement between the parts in a direction normal to said side walls.

24. In a module circuit system, a series of module blocks mounted in a row, a series of support members interposed between adjacent sides of said blocks, a plurality of parallel elongated connector contacts arrayed on opposite sides of the support members, at least one of the contacts on one side of a support member being aligned with and connected to a contact on the other side, a plurality of mating contacts on the adjacent sides of the blocks and respectively paired with the contacts on the facing sides of the support members, each pair of contacts comprising a channel part and a channel insert part slidably engageable in the channel part, one of the parts having means laterally resilient relative to the channel part sidewalls for spring pressure engagement with the other part.

25. An electrical assembly comprising a supporting member, a pair of panels mounted on said supporting member in spaced substantially parallel relation, elongated electrical conductors on the outside faces of said panels, spaced elongated electrical contacts on confronting faces of said panels extending normal to said electrical conductors, means for electrically connecting the contacts on the confronting faces of each panel with individual ones of the conductors on the outside face of the same panel, and an electrical unit slidably inserted between said panels and having electrical contacts mating with said spaced contacts on the confronting faces of the panels.

26. A system for interconnecting modular circuit units comprising a pair of spaced parallel side walls each having circuitry lines on at least one surface, a plurality of module blocks fitted in a row between said side walls and incorporating the electrical components of said units, a plurality of contact paths on the facing surfaces of said side walls selectively connected with said lines, plural contact elements on opposed surfaces of said blocks connected to the electrical components therein, said contact paths and contact elements comprising the mating parts respectively of a series of two-part slide-fit frictional connectors extending laterally of the side walls for independent insertion and removal of the module blocks, the module blocks being interconnected by said lines through said connectors on both side walls, one of said mating parts being channel-shaped for telescopically receiving the other part, one of said parts including spring means for generating contact pressure between the engaged parts upon connection, said other part engaging the opposite sides of the channel-shaped part at a plurality of points along its length.

No references cited.

ROBERT K. SCHAEFER, *Primary Examiner.*